United States Patent [19]

Metzger et al.

[11] 3,778,545

[45] Dec. 11, 1973

[54] FILM SCANNING FOR TELEVISION REPRODUCTION

[75] Inventors: Lenard M. Metzger; David L. Babcock, both of Rochester, N.Y.

[73] Assignee: Eastman Kodak Company, Rochester, N.Y.

[22] Filed: Aug. 3, 1970

[21] Appl. No.: 60,493

[52] U.S. Cl. .......................... 178/7.2, 178/DIG. 28
[51] Int. Cl. ............................................ H04n 5/36
[58] Field of Search ............... 178/7.1, 7.2, DIG. 28

[56] References Cited

UNITED STATES PATENTS

| | | | |
|---|---|---|---|
| 3,604,850 | 9/1971 | Eckenbrecht et al. | 178/DIG. 28 |
| 2,922,841 | 1/1960 | Graziano | 178/DIG. 28 |

*Primary Examiner*—Robert L. Richardson
*Attorney*—Robert W. Hampton and R. Lewis Gable

[57] ABSTRACT

A continuously moving or stationary image bearing medium is automatically scanned to produce video signals for television in response to the detected rate of movement of the medium. The image frames of the medium are scanned in a television field scanning raster pattern of spaced lines at the standard horizontal and vertical deflection frequencies. The rate of movement of the medium is detected, and two 180° out of phase, half-frame rate frequency, sawtooth wave form signals are generated therefrom. Periodic portions of one or the other of the two sawtooth wave forms are combined with the standard vertical deflection frequency, sawtooth wave form signal to produce a complex vertical deflection frequency, sawtooth wave form signal that is effective to automatically register the scanning raster pattern on the proper moving image frame. A stationary frame is detected and automatically scanned by the standard vertical deflection, sawtooth wave form signal, and irregularities in the spacing of the frames or the film rate are automatically compensated for.

32 Claims, 5 Drawing Figures

LENARD M. METZGER
DAVID L. BABCOCK
INVENTORS

BY R. Lewis Gable
Robert W. Hampton

ATTORNEYS

LENARD M. METZGER
DAVID L. BABCOCK
INVENTORS
BY R. Lewis Gable
Robert W. Hampton
ATTORNEYS

LENARD M. METZGER
DAVID L. BABCOCK
*INVENTORS*

BY R. Lewis Gable
Robert W. Hampton

*ATTORNEYS*

LENARD M. METZGER
DAVID L. BABCOCK
INVENTORS

BY R. Lewis Gable
Robert W. Hampton

ATTORNEYS

LENARD M. METZGER
DAVID L. BABCOCK
INVENTORS

BY R. Lewis Gable
Robert W. Hampton

ATTORNEYS

FILM SCANNING FOR TELEVISION REPRODUCTION

BACKGROUND OF THE INVENTION

1. Field of the Invention

This invention relates to apparatus for scanning continuously moving image bearing media to produce an image signal, and more particularly, to a system for adjusting the scanning rate in accordance with the rate of movement of an image bearing medium.

2. Description of the Prior Art

For reproduction of a picture in a television receiver the face of the picture tube is scanned in a predetermined pattern with an electron beam while the intensity of the beam is varied by a video signal in synchronism with a scanning pattern to control the light emitted by the phosphor screen. The scanning procedures in current use differ from country to country because of differences in power supply characteristics and the independent development of different standards. For example, the scanning procedure in use in the United States employs horizontal linear scanning of the beam in an interlaced pattern that includes a total of 525 horizontal scanning lines in a rectangular frame having an aspect ratio of 4:3. The frames are repeated at a rate of 30 per second with two fields interlaced each frame. The first field in each frame consists of 262½ odd scanning lines and the second field in each frame consists of the remaining 262½ even scanning lines. Thus the fields are repeated at a rate of 60 per second — the standard power supply frequency in the United States.

A standard image frame bearing medium such as motion picture film is normally exposed and projected at a rate less than the standard television frame scanning rate. To produce a video signal corresponding to odd and even line television fields from standard motion picture film, it is necessary to scan in an interlaced manner each film frame at least twice while the film is moved at its standard frame rate. For instance, a standard motion picture film is exposed and projected at a rate of 24 frame per second. To produce a 30 frame per second video signal when scanning standard motion picture film, the practice has been to scan certain film frames in two fields, for example, and the remaining film frames in three fields while the film is continuously moving.

In telecine transmission flying spot scanning devices have been used to scan the frames of a motion picture film with a beam of light in the standard interlaced scanning pattern described above. The beam of light is modulated by the image pattern on the film frame, and the modulated light is detected and transformed into a video signal by photoresponsive devices. The transmitted video signal controls the intensity of the electron beam of the television receiver tuned to that station and reproduces the motion picture film frame on the television screen. Since the motion picture film is moved continuously and transversely to the beam of light produced by the flying spot scanning device at a frame rate less than the field scanning rate for the flying spot scanning device, it is necessary to deflect the scanning beam in the direction of movement of the film at the beginning of each frame. Therefore, the frame area of the film scanned remains constant for each scanning field.

Prior art systems have used optical image splitting apparatus or mechanical light directing apparatus to deflect the scanning beam to the same point on the film frame during each scanning field. These systems are relatively cumbersome and subject to mechanical failure.

A further prior art system contemplates the use of apparatus for applying a signal having an irregular amplitude sawtooth wave form to the vertical deflecting coils of a flying spot scanning device to deflect the scanning beam in the direction of film movement. The substantially sawtooth wave form signal applied to the vertical deflecting coils is produced by combining a plurality of signals, namely, one 60 Hz sawtooth wave form signal and two 12 Hz sawtooth wave form signals. The amplitude and phase relationship of the signals are controlled so as to obtain a desired vertical deflection of the beam at the beginning of each scanning fields. Such a prior art system is disclosed in U.S. Pat. No. 2,291,723 to Axel G. Jensen.

The sawtooth wave form signals of the latter system are generated under control of a 60 Hz alternating current source, and the vertical deflection wave is generated independently of the film frame rate. This approach, while theoretically feasible, does not take into account slight variations in the motion picture film frame rate that occur during exposure of the film, and, therefore, the vertical sweep wave may inaccurately deflect the scanning beam at the beginning of each frame. Another advantage of this system is that it cannot be employed to scan a single, stationary frame of film disposed in the scanning station. Furthermore, it is not possible to employ this apparatus to scan motion picture films exposed at different frame rates without recalibrating the sawtooth wave form generating circuits.

SUMMARY OF THE INVENTION

Accordingly, it is an object of the present invention to scan an image bearing medium moving continuously at a variable rate to produce image signals therefrom.

Another object of the invention is to controllably deflect a scanning beam relative to a continuously moving image bearing mdium in accordance with the rate of movement of the medium.

It is also an object of the present invention to controllably deflect a scanning beam on a stationary or a continuously moving image bearing medium in response to the rate of movement of the medium.

A preferred embodiment of the present invention includes a method and apparatus for scanning an image bearing medium such as motion picture film at a scanning station to produce an image signal therefrom. Means are provided to move the image bearing medium through the scanning station at the nominal rate at which the images were recorded on the medium. A sensing means detects the actual rate of movement and generates a train of pulses in accordance with the detected rate. The train of pulses is applied to circuitry for producing alternately first and second sawtooth wave forms in response to consecutive pulses, respectively, of the train. Thus the frequency of each sawtooth wave form is equal to one-half the frequency of the pulse train.

A television field rate sawtooth wave form signal is generated by a circuit means responsive to the 60 Hz line frequency. A logic and gating circuit is responsive to the detected train of signals and the 60 Hz line frequency to combine the television field rate sawtooth wave form alternately with the first and the second sawtooth wave form signal. The resultant complex sawtooth wave form signals is applied to a flying spot scanner to control the deflection of the scanning beam across the moving image bearing medium.

The logic and gating circuit responds to variations in the rate of movment of the image bearing medium sensed by the rate sensing means to alter the composition of the resultant sawtooth wave form signal. It also automatically composes the proper resultant sawtooth wave form signal for scanning image bearing mediums recorded at any nominal rate, and it employs only the television field rate sawtooth wave form signal as the resultant wave form when a stationary image is scanned.

Other objects and advantages of the invention will become apparent from the following description taken in conjunction with the accompanying drawings.

DESCRIPTION OF THE PREFERRED EMBODIMENT

Figure 1:
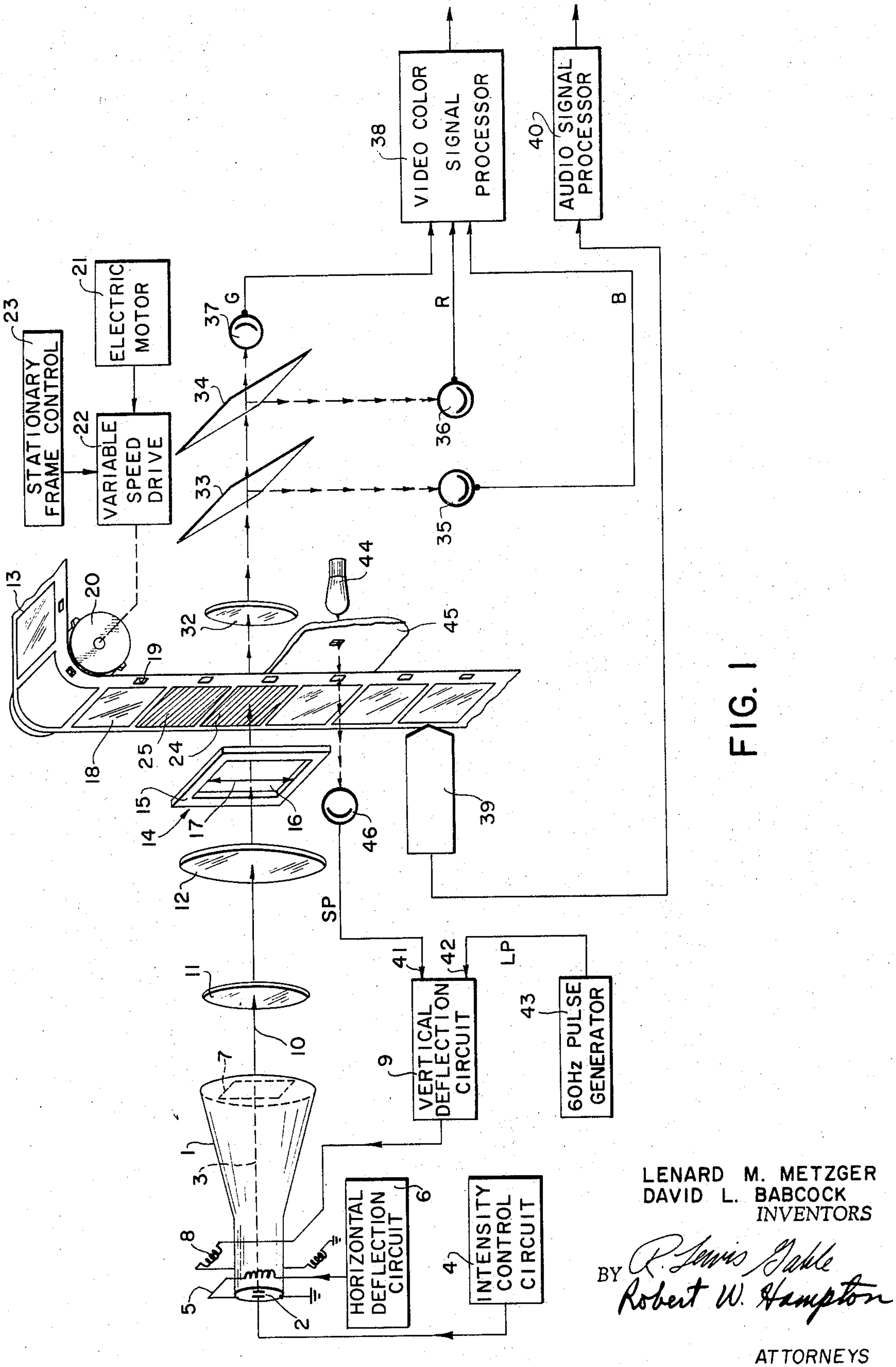
FIG. 1 is a schematic illustration in partial perspective of one embodiment of a film scanning system in accordance with the invention.

Referring now to the drawings and first to FIG. 1 as one preferred embodiment of the invention, there is shown a flying spot scanning system for converting images on a medium into video signals suitable for television transmission or direct application to a television receiver. The scanning system includes a cathode ray tube 1 having a cathode 2 that emits an electron beam 3, the concentration of which is controlled by an intensity control circuit 4. A horizontal deflection yoke 5 operates in a well-known manner under the influence of a horizontal deflection circuit 6 to direct the beam 3 horizontally across a scanning area 7 on the screen of cathode ray tube 1 at a scanning frequency of 15,750 Hz. A vertical deflection yoke 8 operates to deflect vertically the electron beam 3 in response to a complex vertical deflection signal generated by a vertical deflection circuit 9.

The screen of the cathode ray tube 1 preferably is composed of a wide band spectral emission fluorescent material such as zinc oxide ($P_{24}$) phosphor, which, when excited by the electron beam 3, will produce a light spot on the tube face. The scanning area 7 preferably has a rectangular configuration as shown so that the electron beam 3 may be swept across the face of the scanning area in discrete spaced apart lines to generate a scanning light beam 10.

The light beam 10 is condensed by a lens 11 and thereafter focused by a lens 12 onto an image bearing medium 13 located at a scanning station 14. Scanning station 14 may consist of, in the preferred embodiment of the invention, an opaque film gate having an aperture 16 therein. For purposes of illustration of the film gate 15 is shown displaced from the surface of the film 13; in actual practice the film gate would be in very close proximity to the surface of the film 13. The aperture 16 of the film gate 15 has a dimension 17 in the direction of elongation of the film 13 which is related to the rate of movement of the film and the height of film frames 18.

The image bearing medium may take the form of, for example, color motion picture film which has been exposed in a motion picture camera and processed using known techniques. An exemplary film is commercially available Super 8 movie film. As is well knwon in the art, such film is manufactured with spaced sprocket holes 19 along one side that enable the film to be advanced at a predetermined rate in a camera and exposed to record images thereon in spaced discrete frames 18. The standard film exposure frame rate of the prior art is nominally 18 or 24 frames per second with minor variations or fluctuations in the frame rate appearing with variations in the distance between respective sprocket holes. In connection with the disclosed embodiment of the invention, any film frame rate from 0 to 30 frames per second is suitable, and any fluctuations or variations in the film frame rate will be compensated for by the apparatus hereinafter described.

The motion picture film 13 is advanced through the scanning area 14 in the upward direction by a sprocket wheel 20 that is driven in the clockwise direction by an electric motor 21. A variable speed drive 22 interposed between the electric motor and the sprocket wheel 20 may take various forms well known to those skilled in the art such as a gear box that can be controlled by the operator to select the proper rate for projection of the particular motion picture film. A stationary frame control 23 is effective when operated by the operator to halt the movement of film 13 and select a particular frame 18 for still viewing. The stationary frame centering control 23 may also take various forms known in the prior art such as a mechanical clutch for disengaging the electric motor 21 and positioning the particular frame within the scanning area 14.

The scanning light beam 10 passes through the film gate 15 and a frame 18 within the scanning station 14 in the raster pattern described and is modulated by the colored image thereon. The modulated light beam is focused by a lens 32 and is intercepted by dichroic mirror 33 and 34 which are effective to separate and pass the blue, red and green color components of the modulated light to respective photoresponsive devices 35, 36 and 37. The dichroic mirror 33 is effective to reflect the blue color component to the surface of the photoresponsive device 35 and pass the green and red color components to the surface of dichroic mirror 34. Dichroic mirror 34 is effective to transmit the green color component to photoresponsive device 37 and reflect the red color component to photoresponsive device 36. The photoresponsive devices 35, 36 and 37 translate the intensity of their respective color components into electrical signals which are applied to the video color signal processor 38 of the television transmitter or receiver.

The film 13 may have also a sound track which may be detected by an audio reproduction transducer 39 and translated into audio signals for the audio signal processor 40 of a television transmitter or receiver.

AS is well known in the art, images displayed on the screen of a color television tube are created electronically by the scanning of the screen with an electron beam using alternate odd and even line fields. In an odd line field the scanning electron beam of the television tube starts at the upper left corner of the screen as indicated in FIG. 1 in connection with frame 24 and sweeps across the screen at uniform velocity to excite all the picture elements in one horizontal line. At the end of each trace the beam is rapidly returned to the left side of the screen to begin the next horizontal line. The horizontal line slopes downward in a direction of scanning because the vertical deflecting signal simultaneously produces a vertical scan motion which is very slow compared with the horizontal scanning speed. The slope of the horizontal line trace from left to right is greater than the slope of the retrace from right to left because the shorter time of the retrace does not allow much time for vertical deflection of the beam. Thus the electron beam is continuously and slowly deflected downward as it scans the horizontal lines and its position is successively lower as the horizontal scanning proceeds through 262½ lines.

At the bottom center of the field, when the vertical retrace occurs, the electron beam is deflected back to the top center of the screen by the vertical deflection signal to scan another 262½ lines with an even line field as illustrated in film frame 25. The horizontal line traces in the even line fields fall exactly between the horizontal line traces in the odd line fields. The standard television field rate in the United States is 60 fields per second. The successive combination of an odd line field and an even line field is referred to as a television frame having 525 scan lines. Therefore, the television frame rate in the United States is 30 frames per second.

The system hereinbefore described with respect to FIG. 1 is known in the prior art of telecine reproduction. In the past, practioners of the art have either employed optical image deflecting apparatus interposed between the flying spot scanner and the scanning station or vertical deflection apparatus for producing a vertical deflection signal that compensates for movement of the film frames. These prior art approaches have required the employment of highly accurate film moving mechanisms to insure that the scanning raster is properly registered with each moving film frame. In the practice of neither approach have the prior art practioners provided a vertical deflection apparatus that automatically adapts to the detected rate of movement of the moving film. In accordance with the present invention, vertical deflection circuitry is provided that automatically adapts to a wide range of detected film frame rates, compensates for minor fluctuations or variations in the film frame rate, and automatically provides the proper deflection signal when the operator presents a stationary film frame for viewing.

Returning to FIG. 1, there are shown two input conductors 41 and 42 to the vertical deflection circuit 9 of the present invention. A pulse generating circuit 43 applies an input signal LP on conductor 42 representative of the 60 Hz television field rate to the vertical deflection circuit 9. A light source 44 passes a beam of light through an aperture in a mask 45 and thereafter through each sprocket hole 19 as it becomes aligned with the mask aperture during movement of the film 13. A sprocket hole photosensor 46 detects the light passing through each sprocket hole 19 and generates an electrical signal SP in response thereto that has a frequency related to the film frame rate. This signal SP is applied on conductor 41 to another input of the vertical deflection circuit 9 which is responsive thereto to generate a signal having complex vertical deflection sawtooth wave form to control the vertical deflection of the electron beam in the direction of movement of the motion picture film 13. Thus the vertical deflection circuit 9 automatically adapts the vertical deflection of the electron beam to the frame rate of the film. In the event that a single stationary frame of film is scanned in the scanning area, the vertical deflection circuit 9 will respond to the absence of a signal output from photosensor 46 to deflect the electron beam in accordance with the standard television field scanning raster pattern.

The vertical deflection circuit 9 is shown in detail in the block diagram of FIG. 2, and its operation is explained with reference to the exemplary wave form diagrams of FIG. 3, the notations of which relate to the signals developed at specific points in the block diagram. In brief, the block diagram of FIG. 2 includes multivibrator circuits 51 and 54 and AND gates 57 and 58 for transforming the detected output signal SP of sprocket hole photosensor 46 into two uniform half-frame rate frequency signals A′ and B′. Sawtooth generators 61 and 62 are responsive to the signals A′ and B′ to produce two sawtooth wave form signals C and D. A logic and gating circuit including multivibrator circuits 92, 93 and 96 is responsive to signals A′, B′, and the 60 Hz signal LP, generated by pulse generating circuit 43, to control the passage of signals C or D through OR gate 80 to the input of the operational amplifier 87. A sawtooth wave form signal J is combined with the composite wave form signal C + D at the summing input of operational amplifier 87 to produce the complex vertical deflection wave form signal R for the flying spot scaner of FIG. 1. The representative block diagrams of the multivibrator circuits have set S and reset R inputs and Y and $\overline{Y}$ outputs in accordance with symbology employed by Millman and Taub in thier texbook, *Pulse, Digital and Switching Wave Forms*, published by McGraw, Hill Book Co., and in which suitable logic elements, multivibrator circuits and pulse generating circuits may be found to employ in the practice of the present invention. The symbols Y and Y simply means that an output signal on Y is the complement of an output signal on $\overline{Y}$.

Figure 2:
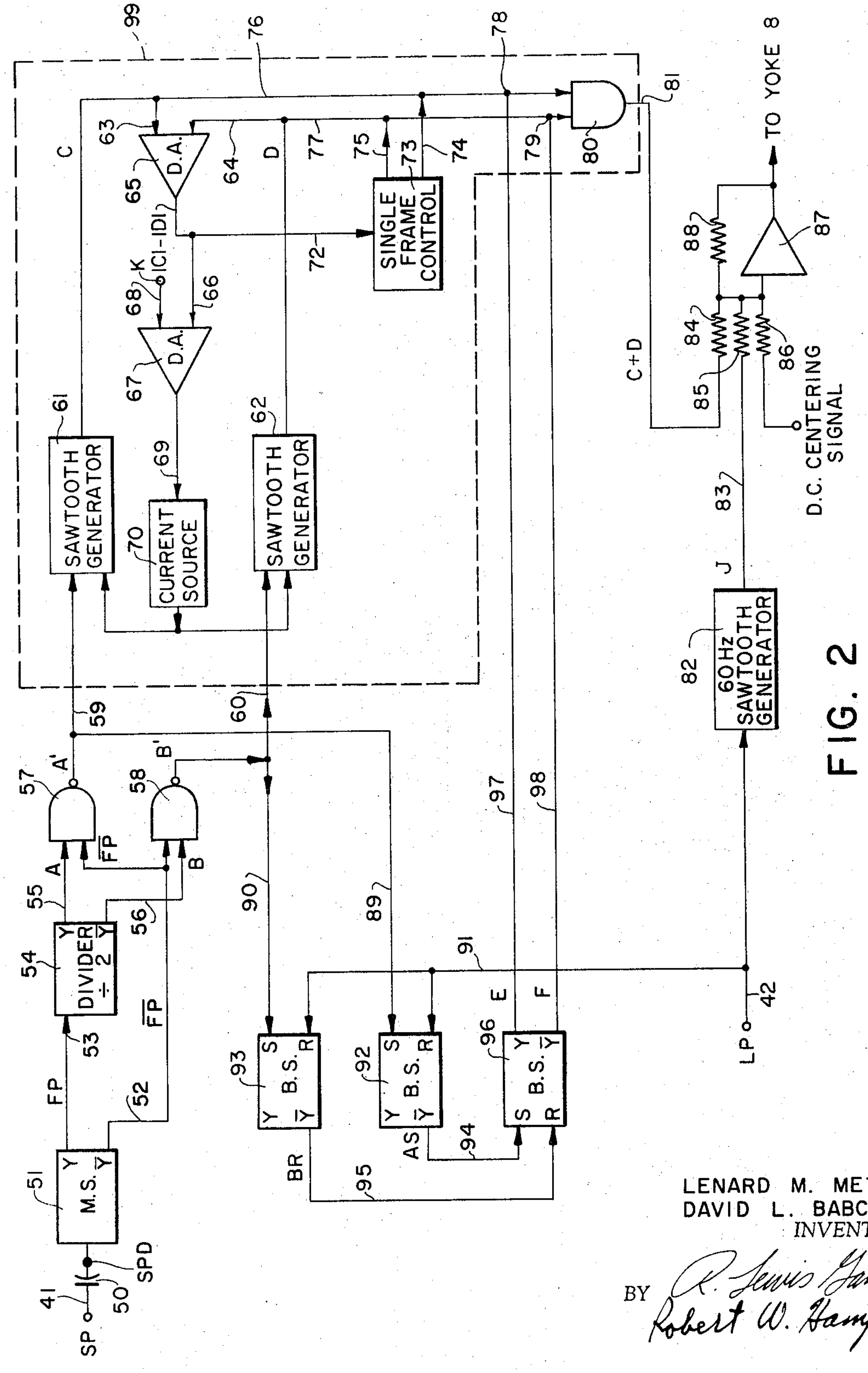
FIG. 2 is a schematic representation in block diagram of a vertical deflection circuit employed in the system of FIG. 1.
Figure 3:
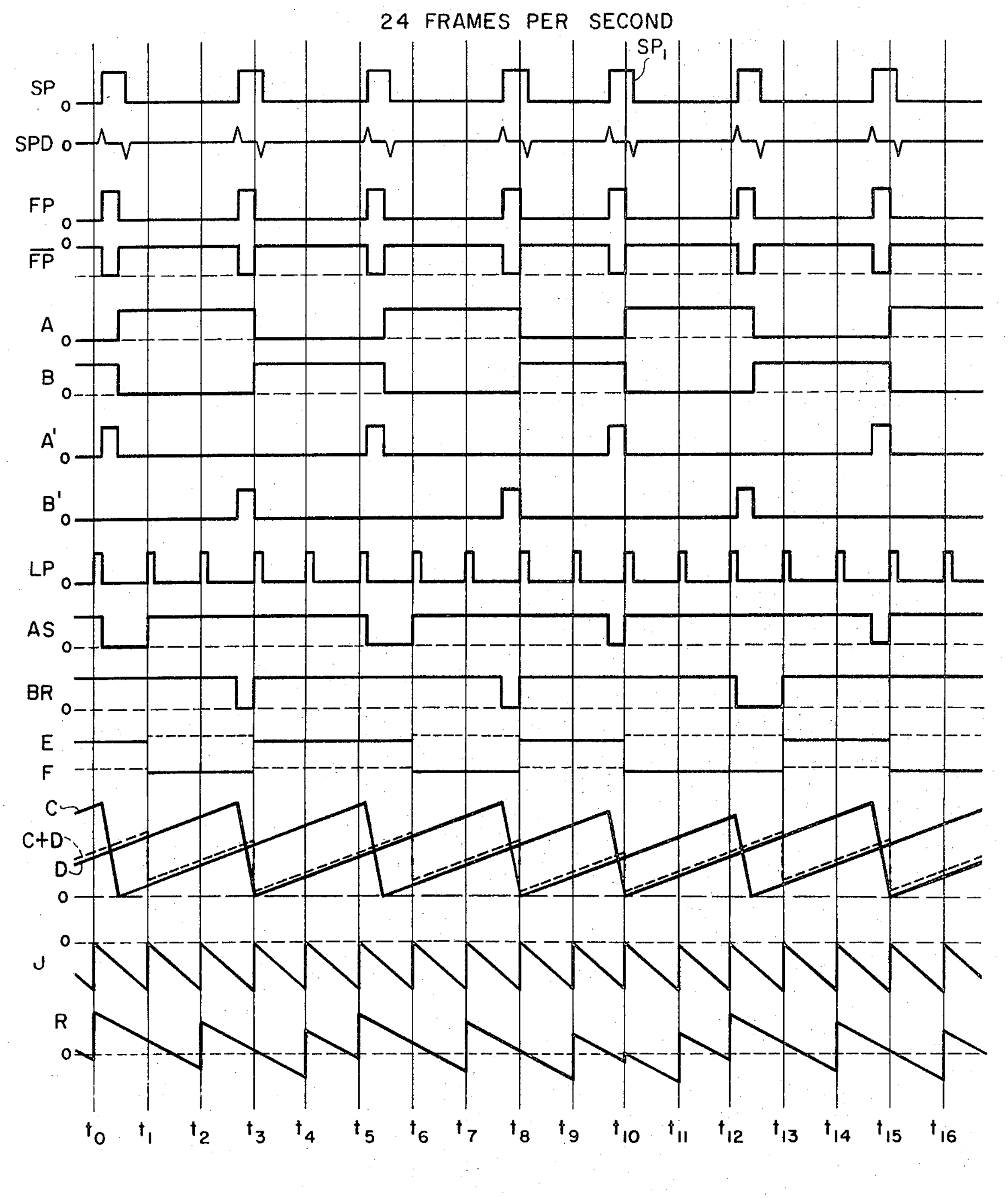
FIG. 3 is a view showing the wave forms of various signals developed at particular points in the block diagram of FIG. 2.

The sprocket hole photosensor 46 of FIG. 1 produces a signal SP shown in the wave form diagrams of FIG. 3 each time a sprocket hole 19 passes between the sprocket hole sensor and the light source 44. That signal SP is a succession of pulses, the frequency of which is dependent upon the width of the sprocket hole and the motion picture film frame rate. Therefore, the sprocket pulses of the signal SP may vary in width and affect the frequency of the signal SP. Referring to FIG. 2, the signal SP is applied to a capacitive differentiating circuit 50 which produces the differentiated wave form SPD of FIG. 3. In the absence of a positive transistion of wave form SPD at the input terminal of monostable circuit 51, a positive output appears at terminal $\overline{Y}$, whereas the other terminal Y is at ground potential. At the appearance of a positive transition of wave form SPD at its input, monostable multivibrator circuit 51 is effective to instantly produce a positive output at terminal Y for a fixed interval of time during which no positive output is developed at terminal $\overline{Y}$. The wave forms FP and $\overline{FP}$ of FIG. 3 result therefor on conductors 52 and 53 from the application of the wave form SPD to the input of monostable circuit 51.

Wave form FP is applied on conductor 53 to the input of frequency divider 54 which is effective to produce complementary half-frame rate frequency wave forms A and B at its output terminals Y and $\overline{Y}$. Wave form A is applied by conductor 55 to one input of a NAND gate 57. Output wave form B is applied by conductor 56 to one input of a NAND gate 58. The wave form FP is simultaneously applied to the other inputs of NAND gates 57 and 58.

NAND gate 57 is effective to produce an output signal when neither a pulse of wave form A nor a pulse of wave form $\overline{FP}$ is applied to its inputs and thus will produce a wave form A′ in response to the absence of wave forms A and FP. In like manner, NAND gate 58 is only effective to produce an output signal when neither a pulse wave form B nor a pulse wave form $\overline{FP}$ is applied to its inputs and thus will produce an output wave form B′ in response to the absence of wave forms B and $\overline{FP}$. It will be noted that wave forms A′ and B′ have pulse frequencies half the frequency of wave form FP and are in phase with the alternate pulses of wave form FP. Furthermore, the pulses of wave forms A′ and B′ have periods selected for convenience as equal to the vertical retrace time period between successive scanning fields.

Wave forms A′ and B′ are applied by conductors 59 and 60 to the input terminals of sawtooth generators 61 and 62, respectively, whereby the positive transistions of wave forms A′ and B′ cause the generation of sawtooth wave form C and D, respectively. Referring to FIG. 3, sawtooth wave form C, for example, commences in response to a positive transistion for wave form A′ and increases from ground potential to a positive potential sufficient in magnitude during uniform movement of the film to deflect vertically the scanning beam of a flying spot scanner through a distance equal to two film frames. When the positive transistion of wave form A′ repeats, sawtooth wave form C immediately decreases to ground potential and then increases again to the positive potential. In like manner, sawtooth wave form D repetitively increases and decreases from ground potential in response to the positive transistions of wave form B′. The frequency of wave forms C and D is equal to half the frequency of wave forms FP.

Sawtooth wave forms C and D are applied by conductors 63 and 64 to the input terminals of a differential amplifier 65 which is effective to continuously detect the absolute voltage difference between wave forms C and D and to produce an output signal representative of such a difference. Referring now to FIG. 3, it will be observed that the linear rate and frequency of sawtooth wave forms C and D are constant in the interval between $t_0$ and $t_{10}$. Therefore, the absolute voltage difference between sawtooth wave forms C and D at any instant during uniform movement of the film frames will be constant at one-half the peak voltage of the wave forms, although the voltage difference, with respect to either of the wave forms C or D, will change polarity during the positive transitions of wave forms A′ and B′. The constant voltage output of differential amplifier 65 is applied by conductor 66 to one input terminal of a differential amplifier 67. Conductor 68 applies to the other input terminal a reference potential K equal in magnitude to that of the vertical deflection voltage necessary to deflect vertically the scanning beam of FIG. 1 through a single film frame. The output signal of differential amplifier 67 is applied by conductor 69 to a current source 70 to control the rate at which current is applied to sawtooth generators 61 and 45. In the event that the output of differential amplifier 65 increases or decreases below the reference potential K due to irregular behavior of the sawtooth generators 61 and 62 over a relatively long period of time, the output signal of differential amplifier 67 is effective, when applied to current source 70, to increase or decrease the current supplied to sawtooth wave form generators 61 and 62. Effectively, the output of differential amplifier 67 represents a negative feedback signal to stabilize the gain of sawtooth generators 61 and 62.

A single frame control circuit 63 is also responsive to the output signal of differential amplifier 65. The circuit 73 develops on conductors 74 and 75 a clamping signal that results in the substitution of a DC voltage level for the sawtooth wave forms C and D when the wave forms A′ and B′ have ceased. Wave forms A′ and B′ cease whenever the operator of the scanning device of FIG. 1 halts the movement of film through operation of the stationary frame control 23 to view a single film frame within the scanning station.

The sawtooth wave forms C and D are also applied by conductors 76 and 77 to the input terminals 78 and 79 of OR gate 80. OR gate 80 is normally effective under the control of the logic and gating circuitry to be described hereinafter to pass one or to the other of the sawtooth wave forms by conductor 81 and resistor 84 to the summing input of the operational amplifier 87. A sawtooth wave form generator 82 is effective to produce a recurring signal having a field rate frequency sawtooth wave form depicted as J in FIG. 3 in response to the positive transitions of signal LP appearing on conductor 42. Sawtooth wave forms J is applied by conductor 83 and resistor 85 to the summing input of the operational amplifier 87. An adjustable DC centering potential is also applied through resistor 86 to the summing input of the operational amplifier 87. The wave form J, the centering potential, and the portion of wave forms C or D passed through OR gate 80 are combined and amplified by operational amplifier 87. A resistor 88 connects the output of operational amplifier 87 to the summing input of the amplifier to stabilize its gain. The output of the operational amplifier 87 is thereafter applied to the vertical deflection yoke 8 of the flying spot scanner of FIG. 1.

The bistable multivibrators or flip-flops 92, 93 and 96 are provided for selecting one or the other of the two half-frame rate sawtooth wave forms C or D for combining with the television field rate sawtooth wave form J at the summing input of operational amplifier 87. The wave forms A′ and B′ are applied by conductors 89 and 90 to the set inputs of bistable multivibrators 92 and 93, respectively. The pulse wave form LP is applied by conductors 42 and 91 to the reset inputs of each bistable multivibrator. A positive going transition of wave form A′ sets the state of the bistable multivibrator 92 to remove a positive output voltage from terminal $\overline{Y}$. The positive going transition of pulse wave form LP resets the bistable multivibrator 92 to produce a positive output voltage at the output terminal $\overline{Y}$. The resultant wave form, designated AS in FIG. 3, appears on line 94, and the time period in which the positive output voltage is removed from the terminal $\overline{Y}$ is a measure of the difference in time between occurrences of the positive going transistions of wave forms A' and LP. In like manner wave forms B' and LP act on bistable multivibrator 93 to produce its $\overline{Y}$ output terminal the wave form BR. The wave forms AS and BR are applied by conductors 94 and 95 to the set and reset inputs of bistable multivibrator 96. The resultant conditions E and F at the Y and $\overline{Y}$ outputs of bistable multivibrator 96 have an irregular period related to the difference in time between positive going transistions of wave forms AS and BR. The conditions represent open (dotted lines) and closed (solid lines) current conduction paths at the Y and $\overline{Y}$ outputs of bistable multivibrator 96. In the closed condition, conductors 97 and 98 conduct current to ground potential. In the open condition, conductors 97 and 98 do not conduct current. The conductors 97 and 98 connected to input terminals 78 and 79 of OR gate 80 are therefore effective, during the closed period, to shunt the wave forms C and D, respectively, to ground.

Therefore, as shown by conditions E and F, only one or the other of the waveforms C and D pass through the OR gate 80. The composite wave form C + D on line 81 at the examplary 24 frame per second rate depicted in FIG. 3 has an irregular period equal to 1/20 th and 1/30th of a second in a repeating pattern. At transistions in the wave form, such as at times $t_1$ and $t_3$, the amplitude of the wave form changes by an amount equal to the film frame height. The 60 Hz sawtooth wave form J has a vertical deflection at each of the time periods $t_0$, $t_1$, etc., equal to the deflection of an electron beam at the beginning of each television field. As indicated hereinbefore, the 60 Hz sawtooth wave form J is summed with the composite wave form C+ D at the summing input of the operational amplifier 87. The resultant complex vertical deflection raster wave form R necessarily has a slope different from the slopes of either wave form J or composite wave form C + D, and the actual vertical deflections of the scanning fields of the flying spot scanner are eaual to 3/5's of a film frame height at the exemplary 24 frames per second rate.

Figure 4:
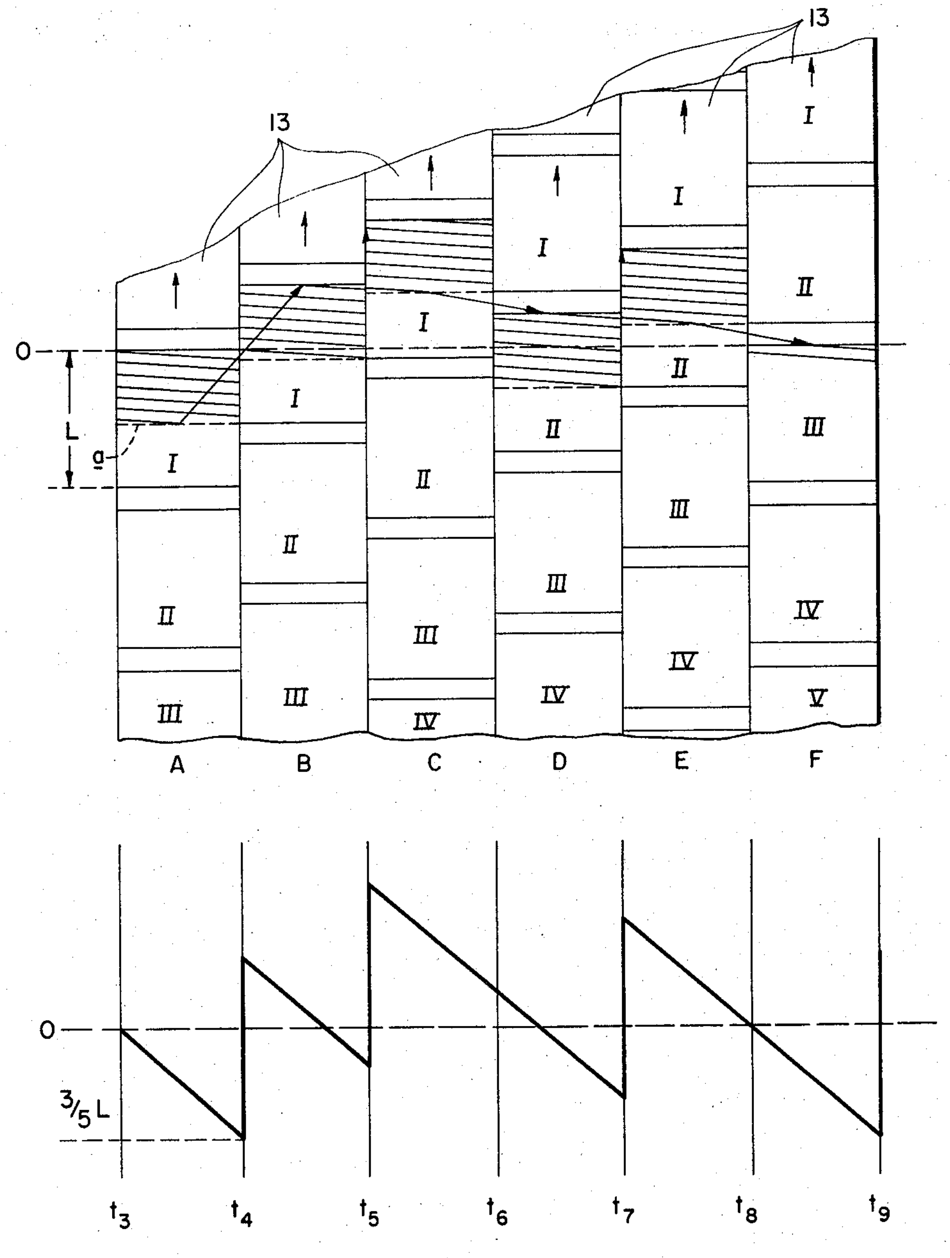
FIG. 4 is a diagram describing the scanning pattern employed in accordance with the invention.

Referring now to FIG. 4, there is shown in the upper portion thereof a motion picture film 13 (the usual sound track and sprocket holes being omitted for simplicity) in six successive positions designated A to F inclusive, the film being in these positions at the starting times of six successive field scanning periods. The successive frames of the film are designated by the Roman numerals I, II, III, etc., and the film is moved in the direction of the arrows continuously at the exemplary rate of 24 frames per second. In the lower portion of FIG. 4 there is shown the resultant wave form R during the interval $t_3$ through $t_9$ of FIG. 3.

At time $t_3$, film frame I in position A is within the scanning station 14 of FIG. 1. Superimposed upon the film frame I is an even line scanning raster that starts at the top left of the film frame and proceeds downward in accordance with the slope of wave form R until $t_4$. At time $t_4$ the scanning raster pattern has scanned an area in the scanning area on the face plate of the flying spot scanner equal to 3/5's of the film frame. However, at the dotted line *a* indicates, the film frame I has advanced in the direction of movement of the film so far that the even line scanning raster generated by the scanning beam has scanned the entire frame of film.

At time $t_4$, as shown in the wave form R, the scanning beam is deflected vertically upward to the top center of film frame I in position B, and an odd line field is scanned on the face of the flying spot scanner through an area equal to 3/5's of a film frame. At time $t_5$, the scanning beam is deflected vertically upward to the top left of film frame I and proceeds downward to produce a second even-line scan. At time $t_6$, the scanning beam of the flying spot scanner, as shown by the vertical deflection wave form R, is not deflected but continues downward. As shown at position D, the scanning raster begins at the top center of the film frame II and continues through 3/5's of the film frame height. At time $t_7$, the scanning beam is deflected upward again to the top left of film frame II which is scanned in an even line field. At time $t_8$, the scanning raster continues to the top center of film frame III which now is in exactly the same position with respect to the scanning station as film frame I at positon A. Therefore, it may be observed that film frame I is scanned in even, odd and even fields and film frame II is scanned in odd and even fields. The vertical deflection wave form R accomplishes this scanning in the sequence of fields shown for all successive film frames entering the scanning station at the exemplary film frame rate.

It should be understood that the wave forms of FIG. 3 are simply illustrative of the operation of the elements of FIG. 2 in the production of a wave form R at one nominal frame rate.

In a similar manner, the circuit of FIG. 2 is effective to produce a wave form R suitable for any integral or non-integral film frame rate. Only the wave forms LP and J of FIG. 3 remain constant, whereas the period of sawtooth waves C and D and the period of conditions E and F depend upon the detected film frame rate and the constant field scanning rate. For example, each frame of a film recorded at 20 frames per second is scanned by three fields. For all the frame rates between 20 and 30 frames per second, the film frames are scanned by either two or three fields. For all the frame rates between 10 and 20 frames per second, the film frames are scanned by either three or four fields. For frame rates between 0 and 10 frames per second, the film frames are scanned by from 60 to 6 fields in each second.

The deflection circuit 9 is also effective to produce a signal R that compensates for any minor fluctuations in the distance between sprocket holes in the film created during the manufacture of the film or by film shrinkage. Referring back to FIG. 3, and particularly to sprocket pulse SP1, there is shown a detected fluctuation in the spacing of the film frames. The pulses of wave forms A' and B' generated in response to the detection of wave form SP1 are effective to cause sawtooth wave forms C and D to decrease to ground potential and restart at a time earlier than they normally would. The voltage difference between wave forms C and D at time $t_{10}$ is decreased until the next sprocket pulse wave form B', at which time the voltage difference will stabilize as the period between successive sprocket pulses becomes constant. Wave forms AS and BR are also reduced to ground potential at respective times earlier than they normally would. Complementary conditions E and F at time $t_{10}$ also change in duration since they are dependent upon the positive transistions of wave forms AS and BR. The durations of conditions E and F after time $t_{10}$ are reversed with respect to the durations existing before time $t_{10}$.

An examination of the composite wave form C + D at time $t_{10}$ reveals a transistion of a magnitude less than a full frame height. When the composite wave form C + D and wave form J are summed, the resultant wave form R at time $t_{10}$ differs from the previous pattern of the wave form. Since the positioning of the sprocket pulse SP1 indicates that the film frame to be scanned appears in the scanning station earlier than it regularly should, the wave form R at time $t_{10}$ is effective to deflect the scanning beam at the start of the field to be scanned a distance effective to reach the top of the film frame. Thereafter, the wave form R repeats itself in the sequence shown before sprocket pulse SP1. In like manner, any variation in the spacings of the sprocket pulse SP1 will be compensated for in the production of the resultant sawtooth wave form R.

Figure 5:
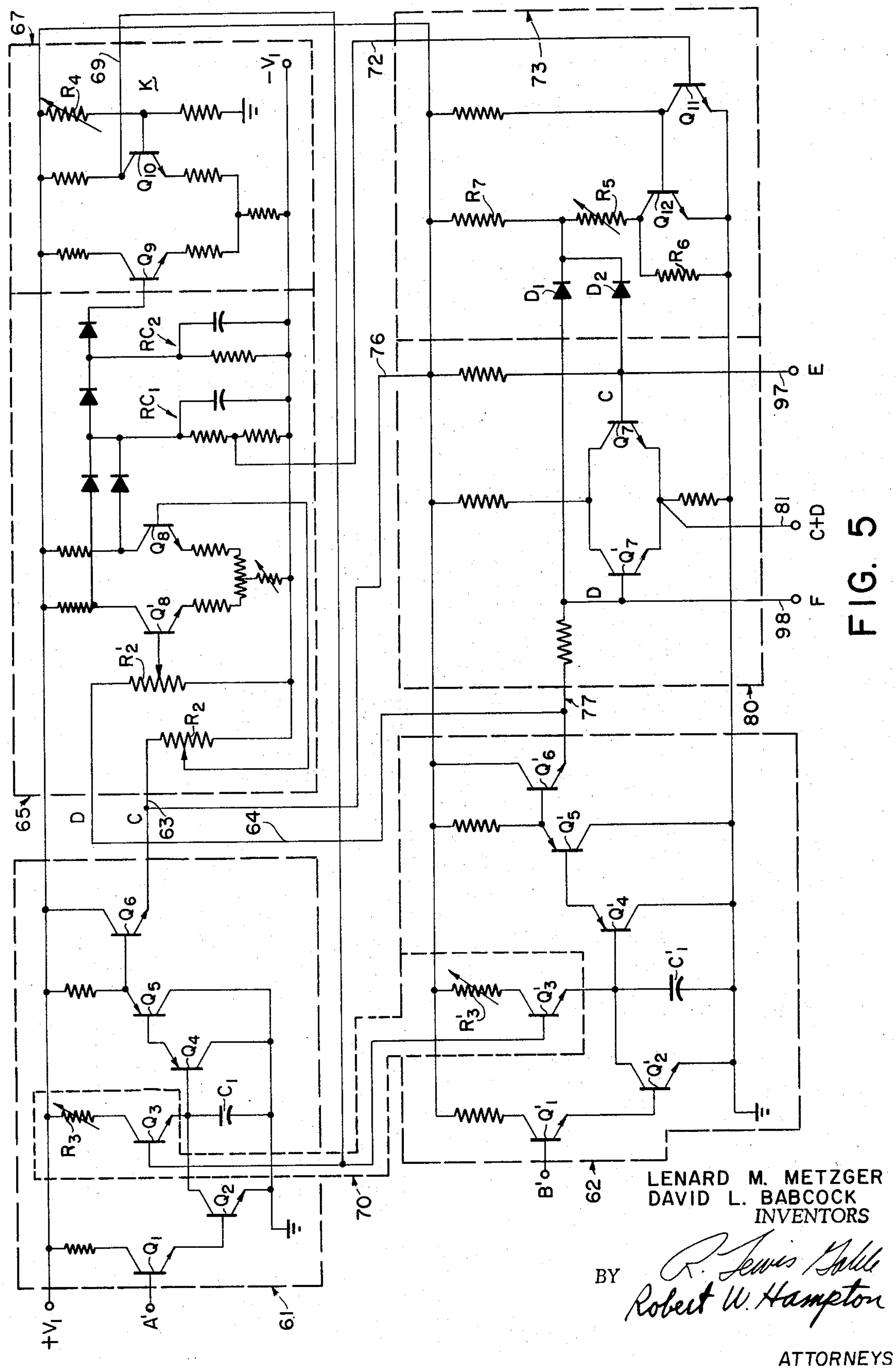
FIG. 5 is an illustrative circuit diagram of a portion of the block diagram of FIG. 2.

Referring now to FIG. 5, there is shown a circuit diagram representative of preferred embodiments of the components within the dotted line 99 of FIG. 2 which include sawtooth generators 61 and 62, differential amplifiers 65 and 67, current source 70, single frame control circuit 73 and OR gate 80.

Referring now to sawtooth generator 61, the input wave form A′ of FIG. 2 is applied to the base of transistor Q1 which is normally nonconductive. A positive transistion of wave form A′ causes transistor Q1 to conduct current from + V1 to the base of normally nonconductive transistor Q2. Transistor Q2 is rendered conductive for the duration of each positive voltage pulse wave form A′. When transistor Q2 is rendered conductive, it rapidly discharges capacitor C1, which had been positively charged through the operation of the current source 70. Upon the termination of each positive voltage pulse of wave form A′, transistor Q2 is rendered nonconductive and capacitor C1 begins to charge to + V1 through the collector-emitter conduction path of transistor Q3. The conduction of current source transistor Q3 is controlled by a negative feedback signal generated on conductor 69 by the output of the differential amplifier 67 in a manner that will be described hereinafter.

When the capacitor C1 is initially discharged to ground potential, transistors Q4 and Q5, arranged in a Darlington circuit configuration, are rendered heavily conductive. Transistor Q6 is immediately rendered nonconductive as its base terminal is switched by transistor Q5 to ground potential. As C1 gradually recharges to the positive voltage source, transistor Q4 and Q5 conduct less and less current at a linear rate, and transistor Q6 conducts more current at the linear rate as the voltage rises at its base terminal. The sawtooth wave form C is therefore created by the linear increase in conduction of transistor Q6.

The sawtooth wave generator 62 operates in like manner to produce the sawtooth wave form D at the emitter terminal of transistor Q6′. In both cases the linearly increasing sawtooth wave forms are terminated at the occurrence of each positive transistion of wave forms A′ and B′ at the base terminal of transistors Q1 and Q1′, respectively.

Sawtooth wave forms C and D are applied by conductors 76 and 77 to the base electrodes of transistor Q7 and Q7′, respectively, that constitute OR gate 80. The conditions E and F are applied to the base electrodes of transistors Q7 and Q7′, by conductors 97 and 98, respectively. The composite wave form C + D appears at the emitter terminals of transistors Q7 and Q7′ on conductor 81.

The base-emitter potential drop of transistors Q6 and Q7 is offset by the base-emitter potential gain of the Darlington circuit constituted by transistors Q4 and Q5. Therefore, temperature dependent voltage variations in the composite wave form C + D are substantially minimized.

It is essential that the transistions from one sawtooth to the other in the composite wave form C + D always produce (at stable frame rates) a vertical deflection of the scanning beam that, when imaged on the film, has a magnitude equal to the center to center spacing of adjacent film frames. This is accomplished by producing the absolute value of the potential difference between wave forms C and D in a differential amplifier 65. The sawtooth wave forms C and D are applied by conductors 63 and 64 across resistive networks R2 and R2′ to the base terminals of transistors Q8 and Q8′, respectively, that constitute the differential amplifier 65. The output signal of the differential amplifier 65 is applied, through two filter circuits RC1 and RC2 and by conductor 66, to one input of differential amplifier 67.

Differential amplifier 67 consists of transistors Q9 and Q10 that generate a negative feedback signal to control the conduction of current source transistors Q3 and Q3′ through comparison of the output signal on conductor 66 with a reference signal K having a magnitude equal to the center to center spacing of adjacent film frames. The output signal of differential amplifier 65 is applied to the base terminal of transistor Q9, whereas the reference signal K, determined by variable resistor R4, is applied to the base terminal of transistor Q10. Any difference between the reference signal and the output signal over a period of time determined by the time constant of filter circuit RC2 alters the negative feedback signal level on conductor 69. Conductor 69 is connected to the base terminals of transistor Q3 and Q3′, and the negative feedback signal is effective to control the rate at which capacitors C1 and C1′ are charged. Therefore, if, over a period of several film frames, the voltage difference between the wave forms C and D rises or falls below the reference voltage, conduction of the transistors Q3 and Q3′ is decreased or increased, respectively, until the potential difference stabilizes. Variable resistors R3 and R3′ are adjusted to compensate for any difference in individual conduction characteristics of the transistors Q3 and Q3′.

It should be noted at this point, that the differential amplifier 67 controlling the current source circuits 70 in the manner described above will automatically adjust the slope and maximum amplitude of the sawtooth wave forms to conform with the frame rate of the film to be scanned. If the center to center spacing of the film frames is changed, variable resistor R4 need only be adjusted to produce the proper sawtooth wave forms.

Filter circuit RC2 referred to hereinbefore has a relatively long time constant, so that it is only gradually responsive to a change in the absolute difference voltage $|C|-|D|$. Filter circuit RC1, however, has a relatively short time constant so that it closely responds to changes in the difference voltage $|C|-|D|$. The voltage developed across filter circuit RC1 is applied by conductor 72 to the input of the single frame control circuit 73.

Reference to the wave forms of FIG. 3 is necessary to describe the operation of single frame control circuit 73. As described hereinbefore, the wave forms A' and B' are developed in response to the detected sprocket pulses of the signal SP. When the operator of the scanning system desires to scan a single frame, he will halt movement of the film by operating the stationary film centering control 23 and prevent the further generation of sprocket pulses. During still frame scanning, only the wave form J is necessary to deflect the electron beam to scan the film frame.

For example, assume that at instant $t_4$ film movement is halted; wave form C as usual will continue to rise until it reaches its peak voltage after $t_5$, whereupon it will continue to rise at its previous rate until transistor Q6 reaches current saturation. Since pulse A' is not generated at $t_5$, wave form C will not restart at ground potential, and its output potential at resistor R2 will become, at saturation, relatively constant. Wave form D, appearing at resistor R2', however, will continue to rise in voltage at its predetermined rate. The voltage difference between wave forms C and D at some point after $t_2$ will begin to rapidly decrease on network RC1, whereas it will slowly decrease on network RC2.

The single frame control circuit 73 contains transistor Q11 which is rendered normally conductive by the potential difference on conductor 72, to prevent transistor Q12 from conducting current. In the nonconductive state of transistor Q12, a voltage developed at a point between resistors $R_7$ and R5 is greater than the maximum potential developed by the sawtooth generators 61 and 62 on conductors 76 and 77, respectively. Therefore, the conduction of diodes D1 and D2 during continuous movement of the film is always blocked.

However, as the voltage difference decreases after time $t_5$, transistor Q11 is rendered nonconductive and transistor Q12 is rendered conductive to bypass resistor R6. A potential equal to the average potential of the composite sawtooth wave forms C + D is developed at the connection point of resistors $R_7$ and R5 and applied to the cathodes of diodes D1 and D2.

At time $t_5$, it will be observed that condition E appearing on conductor 97 is effective to clamp the base electrode of transistor Q7 to ground potential. Therefore, diode $D_2$ will remain reverse biased. However, diode D1 will be rendered conductive as wave form D increases in potential above the average potential of composite wave form C + D. The conduction of diode D1 is effective to clamp the base electrode of transistor Q7' to the average potential of the composite wave form C + D. A DC level output signal is therefore generated on line 81 by the conduction of transistor Q7'.

Therefore, the 60 field per second sawtooth wave form J and the DC output signal on conductor 81 are summed at the input of the operational amplifier 87 to produce a vertical deflection signal effective to scan a single film frame in the scanning station without the necessity of centering the film frame.

From the description of the preferred embodiments set forth above, it is apparent that the invention can be practiced in many alternative ways. For example, the single frame control circuit of FIG. 5 could be replaced by a switch operated in conjunction with the stationary frame centering control 23 of FIG. 1 that would halt the generation of the sawtooth wave forms C and D, or prevent them from being combined into composite wave form C + D, and substitute therefor the average DC signal.

Furthermore, it is apparent that the preferred embodiment of the invention, without modification, will operate in substantially the same manner at the European, 50 per second, television field rate or any other standard field rate.

Also, it is apparent that the rate of movement of the motion picture film or other image bearing media may be detected from indicia recorded on the media or on a timing disc associated with the sprocket wheel.

As may be seen, a novel system has been disclosed for transforming the images and sound track of an ordinary, inexpensive motion picture film into respective video and audio signals for television transmission or direct connection to the antenna terminals of a conventional television receiver. The system is compatible with professional and amateur motion picture films, both black and white and color and with or without sound tracks.

In summary, it will be readily apparent that by virtue of the novel arrangements disclosed whereby the vertical deflection circuit is directly controlled by the detected film frame rate, deflection of the scanning beam is readily effected in exact synchronism with the film movement. The vertical deflection circuit disclosed automatically adapts to a wide range of detected film frame rates, compensates for minor fluctuations in the spacing between film frames or the frame rate itself, and senses that a single frame is to be scanned and automatically applies the proper vertical deflection to the scanning beam to scan the stationary frame.

The invention has been described in detail with particular reference to preferred embodiments thereof, but it will be understood that variations and modifications can be effected within the spirit and scope of the invention.

We claim:

1. In apparatus for deriving an image signal from an information bearing medium having a plurality of successive image frames disposed thereon, the combination comprising:

a. means for defining a scanning station;
b. means for moving the image frames of the information bearing medium at a nominal rate relative to said scanning station;
c. means for scanning, at a predetermined repetitive frequency, said image frames moving relative to said scanning station in a raster pattern comprising a plurality of spaced line scans and for providing an image signal of the scanned image frames;
d. means for detecting the actual rate of movement of said image frames relative to said scanning station and for producing therefrom a first signal having a first frequency equal to the detected rate;
e. means responsive to said first signal for producing second and third signals each having a regular, periodic, wave form of a second frequency, said second frequency being related to said first frequency as a submultiple thereof;
f. means for providing a fourth signal having a regular, periodic, wave form of a third frequency, said third frequency being equal to said repetitive frequency of said scanning means;
g. means operative in a first or a second state, responsive to each occurrence of said fourth signal that immediately succeeds, in time, each occurrence of said first signal for changing the operative state and for producing first and second clamping signals, respectively having respective complementary periods equal to the periods of said first and second state;

h. means responsive to said first and second clamping signals for combining respective complementary periods of said second and third signals, respectively, with said fourth signal for producing a fifth signal having an irregular wave form and a frequency equal to said third frequency; and i. control means for applying said fifth signal to said scanning means to establish said repetitive scanning frequency and to control the position of the scanning raster pattern in synchronism with the movement of each image frame relative to said scanning station.

2. The apparatus of claim 1 wherein said information bearing medium consists of a motion picture film.

3. The apparatus of claim 2 wherein said scanning means comprises:

a. a flying spot scanning device having horizontal and vertical deflection circuit means for repetitively generating said raster pattern at said predetermined repetitive frequency, said predetermined repetitive frequency being equal to the standard television field rate frequency;

b. optical means for correcting said raster pattern on the surface of said image frames moving relative to said scanning station; and c. photosensitive means arranged with respect to said scanned image frames for providing an image signal representative of the information on said scanned image frame.

4. The apparatus of claim 3 wherein said control means is connected to said vertical deflection circuit means to apply said fifth signal thereto.

5. The apparatus of claim 1 wherein said information bearing medium consists of motion picture film having sprocket holes associated with each image bearing frame thereon and wherein said detecting means is disposed with respect to the path of movement of said film for producing said first signal upon the movement of each sprocket hole past said detecting means.

6. The apparatus of claim 5 wherein said detecting means comprises:

a. means for directing radiation towards the path of movement of said sprocket holes; and b. means responsive to the radiation modulated by the sprocket holes for producing said first signal.

7. The apparatus of claim 1 wherein said information bearing medium consists of motion picture film having radiation modulating indicia disposed relative to the image frames thereon and said detecting means comprises:

a. means for directing radiation towards the path of movement of said indicia; and b. means responsive to the radiation modulated by said indicia for producing said first signal.

8. The apparatus of claim 1 wherein said image frames have a first dimension along the length of said information bearing medium, said raster pattern has a second dimension along the length of said information bearing medium, and said control means is responsive to said fifth signal to compress said second dimension by an amount sufficient to compensate for movement of the scanned image frame relative to said scanning station.

9. The apparatus of claim 1 wherein said second frequency is equal to one-half said first frequency and the wave form of said third signal is out of phase by 180° with respect to the wave form.

10. In apparatus for deriving an image signal from an information bearing medium having a plurality of successive image frames disposed thereon, the combination comprising:

a. means for defining a scanning station;

b. means for moving the image frames of the information bearing medium at a nominal rate relative to said scanning station;

c. means for scanning, at a predetermined repetitive frequency, said image frames moving relative to said scanning station in a raster pattern comprising a plurality of spaced line scans and for providing an image signal of the scanned image frames;

d. means for detecting the actual rate of movement of said image frames relative to said scanning station for producing therefrom a first signal having a first frequency equal to the detected actual rate;

e. means responsive to said first signal for producing second and third signals each having a regular, periodic, wave form of a second frequency, said second frequency being related to said first frequency as a submultiple thereof;

f. means for providing a fourth signal having a regular, periodic, wave form of a third frequency, said third frequency being equal to said repetitive frequency;

g. means responsive to each occurrence of said fourth signal that immediately succeeds, in time, each occurrence of said first signal for producing first and second clamping signals having respective complementary periods equal to integral multiples of the period of said fourth signal;

h. means responsive to said first and second clamping signals for combining respective complementary periods of said second and third signals, respectively, with said fourth signal for producing a fifth signal having an irregular wave form and a frequency equal to said third frequency; and i. control means for applying said fifth signal to said scanning means to establish said predetermined repetitive frequency and to control the position of said raster pattern in synchronism with the movement of each image frame relative to said scanning station;

11. In apparatus for deriving an image signal from an information bearing medium having a plurality of successive image frames disposed thereon, the combination comprising:

a. means for defining a scanning station;

b. means for moving the image frames of the information bearing medium at a nominal rate relative to said scanning station;

c. means for scanning, at a predetermined repetitive frequency, said image frames moving relative to said scanning station in a raster pattern comprising a plurality of spaced line scans and for providing an image signal of the scanned image frames;

d. means for detecting the actual rate of movement of said image frames relative to said scanning station and for producing therefrom a first signal having a frequency equal to the detected actual rate;

e. means responsive to said first signal for producing second and third signals each having a regular sawtooth wave form of a second frequency, said second frequency being related to said first frequency as a submultiple thereof;
f. means for providing a fourth signal having a regular sawtooth wave form of a third frequency, said third frequency being equal to said predetermined repetitive frequency;
g. means operative in a first or a second state, responsive to each occurrence of said fourth signal that immediately succeeds, in time, each occurrence of said first signal for changing the operative state and for producing first and second clamping signals, respectively, having respective complementary periods equal to the periods of said first and second state;
h. means responsive to said first and second clamping signals for combining respective complementary periods of said second and third signals, respectively, with said fourth signal for producing a fifth signal having a complex sawtooth wave form and a frequency equal to said third frequency; and
i. means for applying said fifth signal to said scanning means to establish said predetermined repetitive frequency and to control the position of said raster pattern in synchronism with the movement of each image frame relative to said scanning station.

12. The apparatus of claim 11 wherein said second frequency is equal to one-half said first frequency and the sawtooth wave form of said third signal is out of phase by 180° with respect to the sawtooth wave form of said second signal.

13. The apparatus of claim 12 wherein said scanning means comprises:
a. a flying spot scanning device having horizontal and vertical deflection circuit means for repetitively generating said raster pattern at said predetermined repetitive frequency, said predetermined repetitive frequency being equal to the standard television field rate frequency;
b. optical means for directing said raster pattern upon the surface of each image frame moving relative to said scanning station; and
c. photosensitive means arranged with respect to said scanned image frames for providing an image signal representative of the information on said scanned image frame.

14. The apparatus of claim 13 wherein said control means is connected to said vertical deflection circuit and is effective to apply said fifth signal to said vertical deflection circuit.

15. The apparatus of claim 14 wherein said image frames have a first dimension along the length of the information bearing medium, said raster pattern has a second dimension along the length of said information bearing medium, and said vertical deflection circuit is responsive to said fifth signal to compress said second dimension by an amount sufficient to compensate for movement of each scanned image frame relative to said scanning station.

16. In apparatus for deriving an image signal from an information bearing medium having a plurality of successive image frames disposed thereon, the combination comprising:
a. means for defining a scanning station;
b. means for moving the image frame of the information bearing medium at a nominal rate relative to said scanning station;
c. means for scanning, at a predetermined repetitive frequency, said image frames and moving relative to said scanning station in a raster pattern comprising a plurality of spaced line scans and for providing an image signal of the scanned image frames;
d. means for detecting the actual rate of movement of said image frames relative to said scanning station and for producing therefrom a first signal having a first frequency equal to the detected actual rate;
e. means responsive to said first signal for producing second and third signals each having a second frequency related to said first frequency as a submultiple thereof;
f. means responsive to said second and third signals for producing respective fouth and fifth signals each having regular periodic wave forms of said second frequency;
g. means for providing a sixth signal having a regular periodic wave form of a fourth frequency equal to said predetermined repetitive frequency;
h. means operative in a first or second state, responsive to each occurrence of said sixth signal that immediately succeeds, in time, each occurrence of said second and third signals, respectively, for changing the operative state and for producing first and second clamping signals, respectively, having complementary periods equal to the periods of said first and second state;
i. means responsive to said first and second clamping signals for combining respective complementary periods of said fourth and fifth signals, respectively, with said sixth signal for producing a seventh signal having an irregular wave form and a frequency equal to said fourth frequency; and
j. control means for applying said seventh signal to said scanning means to establish said repetitive scanning frequency and to control the position of said raster pattern in synchronism with the movement of each image frame relative to said scanning station.

17. The apparatus of claim 16 wherein:
a. said fourth and fifth signals each have a regular sawtooth wave form, the sawtooth wave form of said fifth signal being out of phase by 180° with respect to the sawtooth wave form of said fourth signal;
b. said sixth signal has a regular sawtooth wave form; and
c. said seventh signal has a complx sawtooth wave form.

18. The apparatus of claim 16 wherein said means for producing first and second clamping signals comprises:
a. first means operative in a first or second state in response to said second signal and said sixth signal, respectively, for producing an eighth signal when said first means is rendered operative in said second state;
b. second means operative in a first or second state in response to said third signal and said sixth signal, respectively, for producing a ninth signal when said second means is rendered operative in said second state; and c. third means operative in a first or a second state in response to said eighth and ninth signals, respectively, for establishing the respective complementary periods of said first and second clamping signals.

19. In apparatus for deriving an image signal from an information bearing medium having a plurality of successive image frames disposed thereon, the combination comprising:

a. means for defining a scanning station;

b. means operable, in a first mode, for moving the image frames of the information bearing medium at a nominal rate relative to said scanning station and operable, in a second mode, for locating a single image frame in a stationary relationship with respect to said scanning station;

c. means for scanning, at a predetermined repetitive frequency, said image frames moving relative to said scanning station and said single image frame in a raster pattern comprising a plurality of spaced line scans and for providing an image signal of the scanned image frames;

d. means for detecting in said first mode of operation of said moving means, the actual rate of movement of said image frames relative to said scanning station and for producing therefrom a first signal having a frequency equal to the detected actual rate;

e. means responsive to said first signal for producing second and third signals each having a regular, periodic, wave form of a second frequency, said second frequency being related to said first frequency as a submultiple thereof;

f. means for providing a fourth signal having a regular periodic wave form of a third frequency, said third frequency being equal to said predetermined repetitive frequency;

g. means operative in a first or a second state, responsive to each occurrence of said fourth signal that immediately succeeds, in time, each occurrence of said first signal for changing the operative state and for producing first and second clamping signals, respectively, having respective complementary periods equal to the periods of said first and second state;

h. means responsive to said first and second clamping signals for combining respective complementary periods of said second and third signals, respectively, with said fourth signal for producing a fifth signal having an irregular wave form and a frequency equal to said third frequency;

i. means responsive to the operation of said moving means in said second mode for producing a third clamping signal;

j. means responsive to said third clamping signal for preventing the combination of said second and third signals with said fourth signal; and k. control means responsive to the operation of said moving means in said first mode for applying said fifth signal to said scanning means to establish said repetitive scanning frequency and to control the position of the raster pattern in synchronism with the movement of each image frame relative to said scanning station and responsive to the operation of said moving means in said second mode for applying said fourth signal to said scanning means to establish said repetitive scanning frequency and to position said raster pattern on said stationary image frame.

20. The apparatus of claim 19 wherein:

a. said second and third signals each have a regular sawtooth wave form, the sawtooth wave form of said third signal being out of phase by 180° with respect to the sawtooth wave form of said second signal;

b. said fourth signal has a regular sawtooth wave form; and c. said fifth signal has a complex sawtooth wave form.

21. In apparatus for deriving an image signal selectively from a series of moving image frames or a single stationary image frame, the combination comprising:

a. means for defining a scanning station;

b. means operative in a first mode for moving the series of image frames at a nominal image frame rate relative to said scanning station and operative in a second mode for locating a single image frame in stationary relationship with respect to said scanning station;

c. means for providing a first signal having a regular periodic wave form of a first frequency;

d. means responsive to said first signal for repetitively scanning at said first frequency both the stationary and the moving image frames disposed with respect to said scanning station in a raster pattern comprising a plurality of spaced line scans and for providing an image signal of the scanned image frame;

e. means for detecting the actual rate of movement of said image frames relative to said scanning station when said moving means is operative in said first mode and for producing therefrom a second signal having a second frequency equal to the detected rate;

f. means responsive to said second signal for producing third and fourth signals each having a regular periodic wave form of a third frequency, said third frequency being related to said second frequency as a submultiple thereof;

g. means operative in a first or a second state, responsive to each occurrence of said first signal that immediately succeeds, in time, each occurrence of said second signal for changing the operative state and for producing first and second clamping signals, respectively, having respective complementary periods equal to the periods of said first and second state;

h. means responsive to said first and second clamping signals for combining respective complementary periods of said third and fourth signals, respectively, with said first signal for producing a fifth signal having an irregular wave form and a frequency equal to said first frequency; and i. control means for applying said fifth signal to said scanning means to establish said repetitive scanning frequency and to control the position of the scanning raster pattern in synchronism with the movement in said first mode, of each image frame relative to said scanning station.

22. The apparatus of claim 21 wherein said series of moving image frames and said single stationary image frame comprises a motion picture film having a plurality of image frames disposed thereon.

23. The apparatus of claim 22 wherein said means operative in a first and second mode is normally operative in said first mode for moving the image frames a nominal image frame rate relative to said scanning station and selectively operative in a second mode for locating one of said image frames in stationary relationship with respect to said scanning station.

24. The apparatus of claim 23 including:

a. means responsive to the selective operation of said moving means in said second mode for producing a third clamping signal; and b. means for applying said third clamping signal to said combining means to prevent the combination of said third and fourth signals with said first signal.

25. An apparatus for deriving an image signal from an information bearing medium having a plurality of successive image frames disposed thereon, the combination comprising:

a. means for defining a scanning station;

b. means operative in a first mode for moving the image frames at a nominal rate relative to said scanning station and operative in a second mode for locating an image frame in stationary relationship with respect to said scanning station;

c. vertical deflection signal generating means operative at a televison field rate frequency for providing a first signal having a sawtooth wave form;

d. flying spot scanning means responsive to said first signal for repetitively generating at said television field rate a scanning raster pattern comprising a plurality of spaced line scans and for scanning the image frames disposed with respect to said scanning station with said raster pattern;

e. means responsive to the scanning of the image frames in said scanning station for providing an image signal of the scanned image frames;

f. means for detecting the actual rate of movement of said image frames relative to said scanning station when said moving means is operative in said first mode and for producing therefrom a second signal having a frequency equal to the detected rate;

g. means responsive to said second signal for producing third and fourth signals each having a sawtooth wave form of a third frequency, said third frequency being equal to one-half said second frequency and the sawtooth wave form of said fourth signal being out of phase by 180° with respect to the sawtooth wave form of said third signal;

h. means operative in a first or a second state, responsive to each occurrence of said first signal that immediately succeeds, in time, each occurrence of said second signal for changing the operative state and for producing first and second clamping signals, respectively, having respective complementary periods equal to the periods of said first and second state, said complementary periods consisting of intergral multiples of the period of said first signal;

i. means responsive to said first and second clamping signals for combining respective complementary periods of said third and fourth signals, respectively, with said first signal for producing a fifth signal having a complex sawtooth wave form and a frequency equal to said first frequency; and j. control means for applying said fifth signal to said vertical deflection circuit means of said flying spot scanning device to control the position of said scanning raster pattern in synchronism with the movement of the image frames relative to said scanning station in said first mode of operation of said moving means.

26. In apparatus for generating a vertical deflection signal having a complex sawtooth wave form for controlling the vertical deflection of the scanning beam of the flying spot scanning device upon the image frames of an information bearing medium moving relative to a scanning station, the combination comprising:

a. means for moving the image frames of the information bearing medium at a nominal rate relative to said scanning station;

b. means for detecting the actual rate of movement of said image frames relative to said scanning station and for producing therefrom a first and a second signal each having a first frequency equal to a submultiple of the detected rate of movment;

c. first sawtooth generating circuit means responsive to said first signal for producing a first sawtooth wave form signal having a frequency equal to said first frequency;

d. second sawtooth wave form signal generating means responsive to said second signals for producing a second sawtooth wave form signal having a frequency equal to said first frequency;

e. means for providing a third signal having a sawtooth wave form and a television field rate frequency;

f. logic means operative in a first or a second state, responsive to each occurrence of said third signal that immediately succeeds, in time, each occurrence of said first signal for changing the operate state and for producing first and second clamping signals, respectively, having respective complementary periods equal to periods of said first and second state; and g. gating means responsive to said first and second clamping signals and said first and second sawtooth wave form signals for combining respective, complementary periods of said first and second sawtooth wave form signals, respectively, with said third signal for producing a vertical deflection signal having a complex sawtooth wave form and a frequency equal to said television field rate frequency.

27. The apparatus of claim 26 wherein said moving means is operable in a first mode for moving said image frames at a nominal rate relative to said scanning station and is operable in a second mode for locating a single image frame in stationary relationship with respect to said scanning station, the combination further comprising:

a. means responsive to the operation of said moving means in said second mode for producing a third clamping signal; and b. means responsive to said third clamping signal for preventing the combination of said first and second sawtooth wave form signals with said third signal and for employing said third signal as said vertical deflection signal.

28. In apparatus for providing a resultant signal having a complex sawtooth wave form, the combination comprising:

a. means for providing a first signal having a first stable frequency;

b. means responsive to said first signal for producing a second signal having a sawtooth wave form of said first stable frequency;

c. means for providing a third and fourth signals each having a second semi-stable frequency, said fourth signal being out of phase by 180° with respect to said third signal;

d. means responsive to said third and fourth signals for producing respective fifth and sixth signals each having a sawtooth wave form of said second frequency;

e. means operative in a first or a second state, responsive to each occurrence of said first signal that immediately succeeds, in time, each occurrence of said third and fourth signal, respectively, for changing the operative state and for producing first and second clamping signals, respectively, having respective complementary periods equal to the periods of said first and second state; and f. means responsive to said first and second clamping signals for combining respective complementary periods of said fifth and sixth signals, respectively, with said second signal for producing a seventh signal having a complex sawtooth wave form and a frequency equal to said first stable frequency.

29. The apparatus of claim 28 wherein said fifth and sixth signal providing means comprises:

a. first and second respective sawtooth wave form generating circuits responsive to each occurrence of said third and fourth signals, respectively, for producing said fifth and sixth sawtooth wave form signals, the sawtooth wave forms of said fifth and sixth signals having equal amplitudes and durations; and b. means for equalizing the amplitude and duration of said sawtooth wave forms of said fifth and said sixth signals.

30. The apparatus of claim 29 wherein said equalizing means comprises a negative feedback network including:

a. first differential circuit means responsive to said fifth and said sixth signals for producing a first potential equal to the absolute value of the instantaneous potential difference between the sawtooth wave forms of said fifth and sixth signals;

b. means for providing a reference potential;

c. second differential circuit means responsive to said absolute difference potential and said reference potential for producing a second different potential; and d. a current source control means connected at its output to said first and second sawtooth wave form generating circuits and responsive to said second difference potential for controlling the amplitude of said fifth and sixth signals.

31. The apparatus of claim 30 wherein said second signal providing means comprises a third sawtooth wave form generating circuit and the sawtooth wave form of said second signal has an absolute amplitude equal to the amplitude of the sawtooth wave forms of said fifth and sixth signals.

32. The method of deriving an image signal from an information bearing medium having a plurality of successive image frames disposed thereon, said method comprising the steps of:

a. moving the image frames of the information bearing medium at a nominal rate relative to a scanning station;

b. scanning at a predetermined repetitive frequency said image frames moving relative to said scanning station in a raster pattern comprising a plurality of spaced line scans and providing an image of the scanned image frames;

c. detecting the nominal rate of movement of said image frames relative to said scanning station and producing therefrom a first signal having a first frequency equal to the detected rate;

d. providing second and third signals each having a regular, periodic, wave form of a second frequency, the second frequency being related to the first frequency as a sub-multiple thereof;

e. providing a fourth signal having a regular, periodic, wave form of a third frequency, the third frequency being equal to the repetitive frequency of said scanning means;

f. detecting each occurrence of the fourth signal that immediately succeeds, in time, each occurrence of the first signal for producing a first clamping signal;

g. detecting each occurrence of the fourth signal that immediately succeeds, in time, each occurrence of the second signal for producing a second clamping signal;

h. combining the first and second clamping signals with the second and third signals, respectively, for producing a fifth signal;

i. combining the fifth signal with the fourth signal for producing a sixth signal having an irregular wave form and a frequency equal to the third frequency; and j. controlling the position of the scanning raster pattern in synchronism with the movement of each image frame relative to said scanning station in response to the sixth signal.

* * * * *